(No Model.)
A. C. FRENCH.
WHIFFLETREE HOOK.
No. 452,668. Patented May 19, 1891.
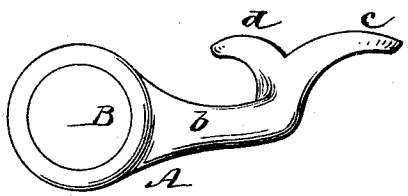
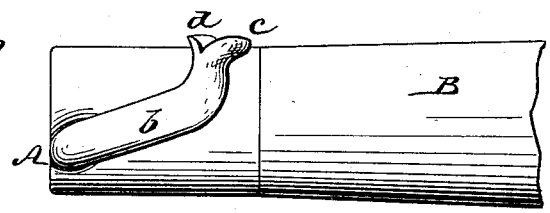
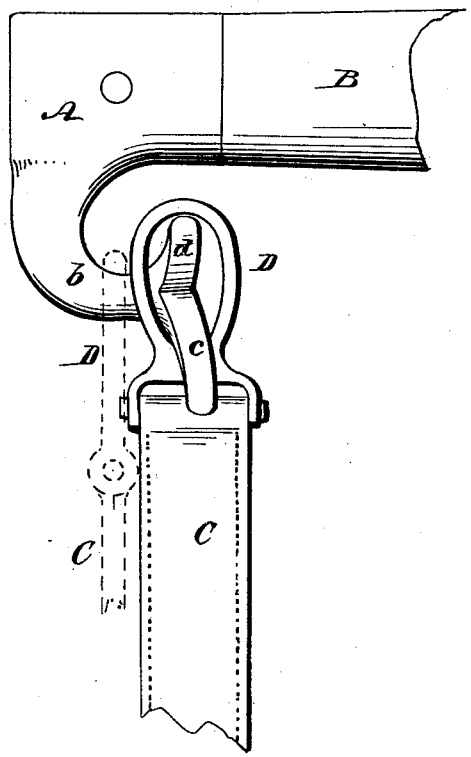

UNITED STATES PATENT OFFICE.

ALBERT C. FRENCH, OF MONMOUTH, ILLINOIS.

WHIFFLETREE-HOOK.

SPECIFICATION forming part of Letters Patent No. 452,668, dated May 19, 1891.

Application filed November 19, 1890. Serial No. 371,910. (No model.)

*To all whom it may concern:*

Be it known that I, ALBERT C. FRENCH, of Monmouth, in the county of Warren and State of Illinois, have invented a new and useful Improvement in Whiffletree-Hooks, of which the following is a full, clear, and exact description.

This invention relates to clip or whiffletree hooks, with which the tugs engage, more especially intended for horse or draft agricultural implements and machines.

The object of the invention is to prevent the cockeye on the end of a harness-tug from working off the hook or becoming accidentally detached; and the invention consists in a novel construction of the clip or whiffletree hook for such purpose, substantially as hereinafter described, and more particularly pointed out in the claim.

Reference is to be had to the accompanying drawings, forming a part of this specification, in which similar letters of reference indicate corresponding parts in all the figures.

Figure 1 represents a longitudinal front view of a whiffletree in part with my improved clip or hook applied; Fig. 2, a side view of the hook with end view of the whiffletree; and Fig. 3, a plan view of the whiffletree in part, with a tug as in the act of being engaged with the clip or hook, showing by dotted lines the tug after it has engaged with the hook and in working position.

A indicates my improved hook, and B the whiffletree in part, on or over the end of which the hook is secured.

The hook A has its forwardly-projecting portion $b$ bent to incline not only upwardly, but also to project inwardly relatively to the length of the whiffletree, and its inward and upper end constructed with two curved horns $c\ d$, arranged substantially at right angles to the forward part of the arm or stem portion $b$ of the hook, the one horn $c$, which is the longer of the two, being in front and the other one $d$ in rear of said stem part.

C is one of the tugs or tug-straps with attached cockeye D. To engage the cockeye with the hook A it is first turned flat and its heel end raised to slip over the forward horn $c$ and subsequently passed over and then under the rear horn $d$. The tug is then turned edgewise and drawn forward, causing the cockeye to slide down the arm or stem part of the hook, and so put it into draft position on the hook, as represented by dotted lines in Fig. 3. The cockeye is thus fitted on or over the hook, as described, as if it were hooked over the horn $d$ first instead of its heel being first passed over the front horn $c$ the latter would prevent said eye from going completely on, the opening in the cockeye being of less length than that of the combined horns $c\ d$, or "double horn," as they might be termed.

By this construction of whiffletree-hook it cannot become detached from the cockeye of the tug or the cockeye from it without the back part of the cockeye first riding up the hook and slipping off the rear horn $d$ and leaving the hook by the front horn $c$, and this the cockeye cannot do without first being turned flat and its heel end raised. Consequently a compound movement is necessary to detach the tug from the hook and necessitates a combination of circumstances in the detachment of the tug that is seldom likely to occur by mere chance. On the other hand, simply using a flat hook with the two horns or double horn in like plane with the stem of the hook, there would in such case be a much greater liability of the tug becoming detached from the hook; but by bending the part of the hook which carries the two horns upward until said horns form a right angle with the general plane of the hook, as shown, it becomes almost impossible for the tug to become accidentally detached.

Having thus described my invention, what I claim as new, and desire to secure by Letters Patent, is—

A whiffletree-hook having its arm $b$ bent upwardly and provided at its end with the curved and diametrically-opposite horns $c\ d$, the horn $c$ projecting forwardly and the horn $d$ rearwardly and of less length than the horn $c$, substantially as herein shown and described.

ALBERT C. FRENCH.

Witnesses:
OELL S. FRENCH,
RENSSELAER W. FRENCH.